Jan. 19, 1971  M. S. COOK  3,556,631
TWO-STAGE IMAGING PROCESS IN WHICH A HALOGRAM IS MADE FROM
A THREE-DIMENSIONAL IMAGE FORMED IN INCOHERENT LIGHT
Original Filed Oct. 25, 1967

INVENTOR.
MELVIN S. COOK
BY
ATTORNEYS

United States Patent Office 3,556,631
Patented Jan. 19, 1971

3,556,631
TWO-STAGE IMAGING PROCESS IN WHICH A HOLOGRAM IS MADE FROM A THREE-DIMENSIONAL IMAGE FORMED IN INCOHERENT LIGHT
Melvin Seymour Cook, Scarsdale, N.Y., assignor to Holobeam Inc., Paramus, N.J., a corporation of Delaware
Continuation of application Ser. No. 678,118, Oct. 25, 1967. This application Sept. 3, 1969, Ser. No. 855,053
Int. Cl. G02b 27/22
U.S. Cl. 350—3.5                                  1 Claim

ABSTRACT OF THE DISCLOSURE

This invention is an apparatus for and a system of photography. Radiation from an object is imaged within a plate of photochromic material. The plate is then used to form a hologram representative of the object in a second operation involving exposure of a photographic plate by transmission of radiation through or scattering of radiation from the exposed plate of photochromic material and interference of such radiation with a reference beam. In certain cases, a third stage of operation may be advisable involving formation of a second hologram from the first hologram in order to obtain a hologram of higher transmissivity.

---

The present invention relates to apparatus for and a system of photography. In particular, the invention makes holography suitable for use by amateurs or others with simple and inexpensive equipment.

This application is a continuation of my parent application, Ser. No. 678,118, filed Oct. 25, 1967. This application is also an improvement over my prior application, Ser. No. 657,475, filed July 28, 1967, entitled "Apparatus for and Method of Photography." In that application, I have disclosed a camera having a single lens system and in which the image of the object is exposed onto photosensitive material. By single lens system, I mean one in which all of the lens elements have an optical center arranged along a common optical axis.

Holography may be conceived of as a two-step method of imagery. In the first step, an object is illuminated with a coherent wave with which it interacts. An interference pattern is then formed by the interference of the secondary wave arising from the presence of the object with the background wave or a portion of the coherent source radiation. This interference pattern is used to expose a photographic plate which, after development, is a hologram representative of the original object. When the hologram is properly illuminated, the transmitted or reflected wave contains information about the original object and has the property that different views of this original object are revealed as the position of observation is altered. The difficulty with the present art is such, however, that the making of holograms is an elaborate process involving expensive equipment. The present invention is intended to overcome these difficulties by a two-stage technique in which the actual formation of the hologram from a simple original exposure is carried out at a later time in a processing laboratory.

Accordingly, one object of the present invention is to provide apparatus for forming a hologram which requires simple equipment at the time of the original exposure.

An additional object of the present invention is to provide a method of forming a hologram which requires only simple equipment at the time of the original exposure.

The present invention is based upon the following considerations.

There is a class of materials known as photochromics which change in optical properties upon exposure to radiation of proper wavelength. In addition, there are other materials whose optical properties alter as a result of exposure to radiation of appropriate composition. One example of a photochromic material is silver iodide. Other silver halides are also photochromics as well as other materials, both organic and inorganic.

It is possible to disperse photochromic materials within a matrix. One such combination is composed of silver iodide or other silver halide crystallite dispersed in a glass matrix. By appropriate heat treatment or optical bleaching using processes and techniques well-known to the art, such a combination may be rendered transparent and sensitized so that upon appropriate exposure to focused radiation emanating from an object, an image of the object will be formed within the photochromic-material-dispersed matrix.

Let us assume that we have a plate formed of silver halide or other photosensitive material dispersed in glass or other such photosensitive combination treated so as to be substantially transparent. Let us call this plate a "photochromic plate." This plate is assumed to have a finite depth as well as a finite width and breadth, that is, it is assumed to have a volume. Within this volume, radiation emanating from an object can be imaged. If this image is sufficiently faint, then a reasonably accurate image of a three dimensional object domain can be focused within the volume of the photochromic plate. However, such photochromic plates are typically far less sensitive than are conventional photographic emulsions, so that for short exposure times only faint images typically will form within the photochromic plate.

Suppose that a photochromic plate has been exposed by having radiation emanating from an object focused to form an image within the photochromic plate by means of a lens and shutter combination. Within the photochromic plate so exposed, an image will have been formed in three dimensions of that portion of the object that is focused by the lens within the photochromic plate. This image typically would not be visible to the unaided eye, although if the exposure has been sufficiently long, the image so formed would be so visible.

This exposed photochromic plate can be used to form a hologram. To do this, coherent radiation of one or more wavelengths can be used. Several techniques are suitable for so forming a hologram. In fact, by regarding the exposed photochromic plate as being an object, the techniques known to the art for forming holograms of objects can be utilized to form a hologram. One such simple techniques merely would involve transmitting coherent radiation such as laser radiation through the exposed photochromic plate and allowing diffracted radiation to interfere with background radiation to form an interference pattern on a conventional photographic plate. Such coherent radiation optimally would be of such a wavelength as to not alter the condition significantly of the exposed photochromic plate. Upon development, the conventional photographic plate so exposed would be a hologram of the image within the photochromic plate and thus be representative of the portion of the original object focused within the exposed photochromic plate.

One type of photochromic glass which could be used in the present invention is basically a borosilicate glass containing silver halide crystallites. Such photochromic glass shows little or no fatigue in its reversibility or power to undergo phototropic changes with repeated exposures. These photochromic glasses may be reversed by application of heat, a process known as thermal fading, or by exposure to light of long wavelength, a process known as optical bleaching. The size and concentration of the silver halide crystallites embedded in the glass matrix of a photochromic glass determines not only the photochromic property, but also whether the unexposed material is transparent, translucent, or opaque. For purposes of the present invention, it is most desirable that the unexposed photochromic material be transparent. A type of photochromic glass which is transparent in the bleached condition contains about $4 \times 10^{15}$ crystallites per cubic centimeter with the sizes of the crystallites being in the range of 50 to 100 angstroms in diameter. Such photochromic glass loses its photochromic properties when the crystallite diameter is below this range of diameters and the crystallites cause scattering of light when they are greater than about 300 angstroms in diameter.

Light imaged in a photochromic glass plate causes silver to separate from the halogens. However, in the particular photochromic glass described, the released halogens are confined by the host glass matrix to be in the immediate vicinity of the crystallites. This confinement is the source of the reversibility of the photochromic glass since recombination of separated silver and halogens can occur by exposure of the photochromic glass plate to heat or optical bleaching radiation.

It should now be clear to those skilled in the art that the present invention can be applied to a wide variety of equipments and many varieties of holograms can be formed in a two-step process using a photochromic plate in the first step to form an exposure and using the exposed photochromic plate in the second step to form a hologram by combination with the known art.

The invention will now be described with reference to the accompanying drawings, in which.

Figure 1:
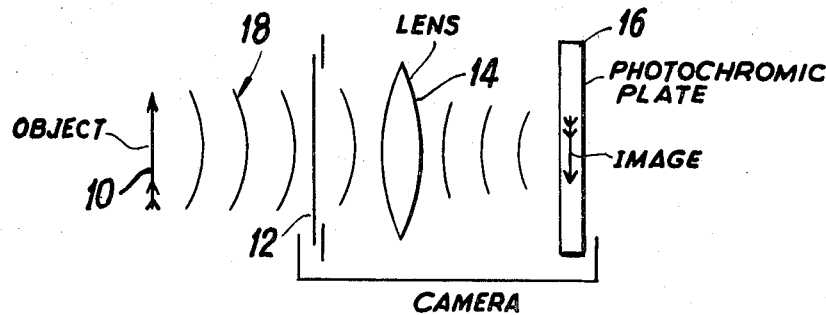
FIG. 1 is a schematic diagram illustrating a photochromic plate in an apparatus for exposing the photochromic plate to radiation emanating from an object.

In FIG. 1, the relation of an object 10, a shutter 12, a focusing lens 14, such as a single lens, or single lens system having all of the lens elements with a center point on a common axis, said single lens or single lens system commonly used as a focusing lens and a photochromic plate 16 in an apparatus for exposing the photochromic plate 16 is shown. Radiation 18 emanating from the object 10 passes through the shutter 12 and is focused by the lens 14 to form an image 20 within the photochromic plate 16.

Figure 2:
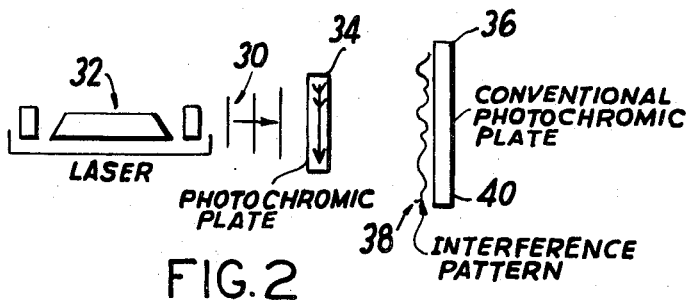
FIG. 2 is a schematic diagram illustrating one technique for forming a hologram from an exposed photochromic plate.

In FIG. 2, coherent radiation 30 from a laser 32 is transmitted through an exposed photochromic plate 34 onto a conventional photographic plate 36. An interference pattern 38 is thereby formed on the conventional photographic plate 36 to form a hologram 40.

Figure 3:
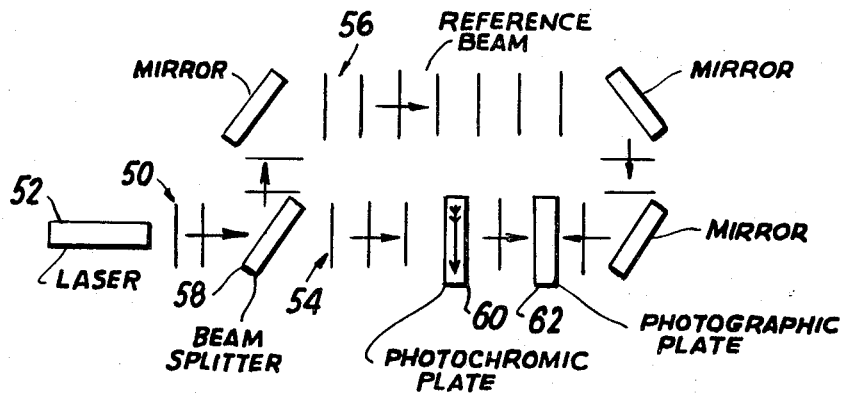
FIG. 3 is a schematic diagram illustrating the formation of a hologram from an exposed photochromic plate by an alternative technique.

In FIG. 3, coherent radiation 50 from a laser 52 is split in two beams 54, 56 by a beam splitter 58. One of the split beams, the reference beam 56 is caused to illuminate a photographic plate 62. The other of the split beams 54 is used to illuminate an exposed photochromic plate 60. Radiation scattered from the image formed in the exposed photochromic plate 60 is caused to interfere with the reference beam 56 on the photographic plate 62. When the photographic plate 62 thus exposed is developed, a hologram is thereby formed.

It should be clear to those skilled in the art that magnification is possible at several points of the two-stage process described herein in the present disclosure. When the photochromic plate is exposed during the first stage, the focusing arrangement that causes radiation emanating from the object being photographed to be focused within the volume of the photochromic plate gives rise to a magnification ratio between dimensions of the objects and corresponding dimensions of the images. During the second stage of the present invention, magnification can be accomplished in several ways. For example, lenses can be used or other focusing arrangements. The techniques involved will be obvious to those skilled in the art once the two-stage nature of the hologram forming technique is understood.

It should be obvious to those skilled in the art that holograms viewable in white light can be formed by techniques known to the art such as causing the interference pattern forming the hologram to be formed by interfering the reference beam and the diffracted beam in the volume of a photographic plate by incidence from opposite sides of the photographic plate. The diffracted beam referred to here is the beam diffracted by the exposed photochromic plate.

While a photochromic plate has been described as being used in the first stage of the present invention, it will be obvious to those skilled in the art that more general classes and configurations of radiation sensitive materials and devices may be used in the present invention whose essential nature is the two-stage process of forming a hologram.

It will also be obvious to those skilled in the art that color holograms viewable in white light can be formed using the present invention. This may be done in several ways using the basic two-stage concept. Radiation from the object may be viewed by separate photochromic plates through different filters or using photochromic plates with different photosensitive materials responsive to radiation of different wavelengths. The exposed photochromic plates may then be used in the second stage to form color holograms by using coherent radiation of different wavelength to form interference patterns on a photographic plate for the separate photochromic plates, when more than one photochromic plate is used, or to interact with the exposed photochromic plate when one photochromic plate is used which has more than one photosensitive material dispersed within its volume, each such photosensitive material being preferentially exposed by different wavelength light and interacting differently with radiation of different wavelength after exposure.

Many other variations and modifications of this novel invention will now be apparent to those skilled in the art. Therefore, this invention is to be limited, not by the specific disclosure herein, but only by the appending claim.

What is claimed is:

1. A process of forming a hologram of a three-dimensional object comprising the steps of, focusing non-coherent radiation reflected from said object, by a single lens system consisting of a plurality of lens elements each having its optical center arranged along a common optical axis, within the volume of a photochromic plate material having a thickness along said optical axis corresponding to the depth of the object along said axis, controlling the intensity of said non-coherent radiation to form a sufficiently faint image within the volume of said plate material such that an accurate three-dimensional image of said object is produced within said volume, whereby corresponding planes of said three-dimentional image and of said object are spaced along said optical axis by proportional amounts, thereafter, at a location remote from the location at which said focusing step was performed, providing a source of coherent radiation having a wavelength that does not materially alter the condition of said exposed photochromic plate material, directing a first portion of said coherent radiation onto said exposed photochromic plate material to produce a diffraction pattern of said image, directing a second portion of said coherent radiation bypassing said photochromic plate material to intersect said diffraction pattern, and exposing a photosensitive plate to the interference pattern formed at the intersection of said first and second portions of said coherent radiation, whereby a hologram of said object is produced on said photosensitive plate.

References Cited

UNITED STATES PATENTS

| | | |
|---|---|---|
| 2,305,799 | 12/1942 | Vierling. |
| 3,235,381 | 2/1966 | Feild _____ 96—40 |
| 3,327,120 | 6/1967 | Weiss. |
| 3,436,353 | 4/1969 | Dreyer et al. _____ 96—90PC |

OTHER REFERENCES

Leith et al., Scientific American, vol. 212, No. 6, pp. 24-35, June 1965.

Pole, Applied Physics Letters, vol. 10, No. 1, pp. 20-22, January 1967.

Product Engineering, pp. 29-31, Feb. 13, 1967.

Van Heerden, Applied Optics, vol. 2, No. 4, pp. 393-400, April 1963.

DAVID SCHONBERG, Primary Examiner

R. J. STERN, Assistant Examiner

U.S. Cl. X.R.

96—27; 350—160